Oct. 20, 1936.  E. W. INGRAM ET AL  2,057,951
BUN BAKING OVEN
Filed Nov. 16, 1935
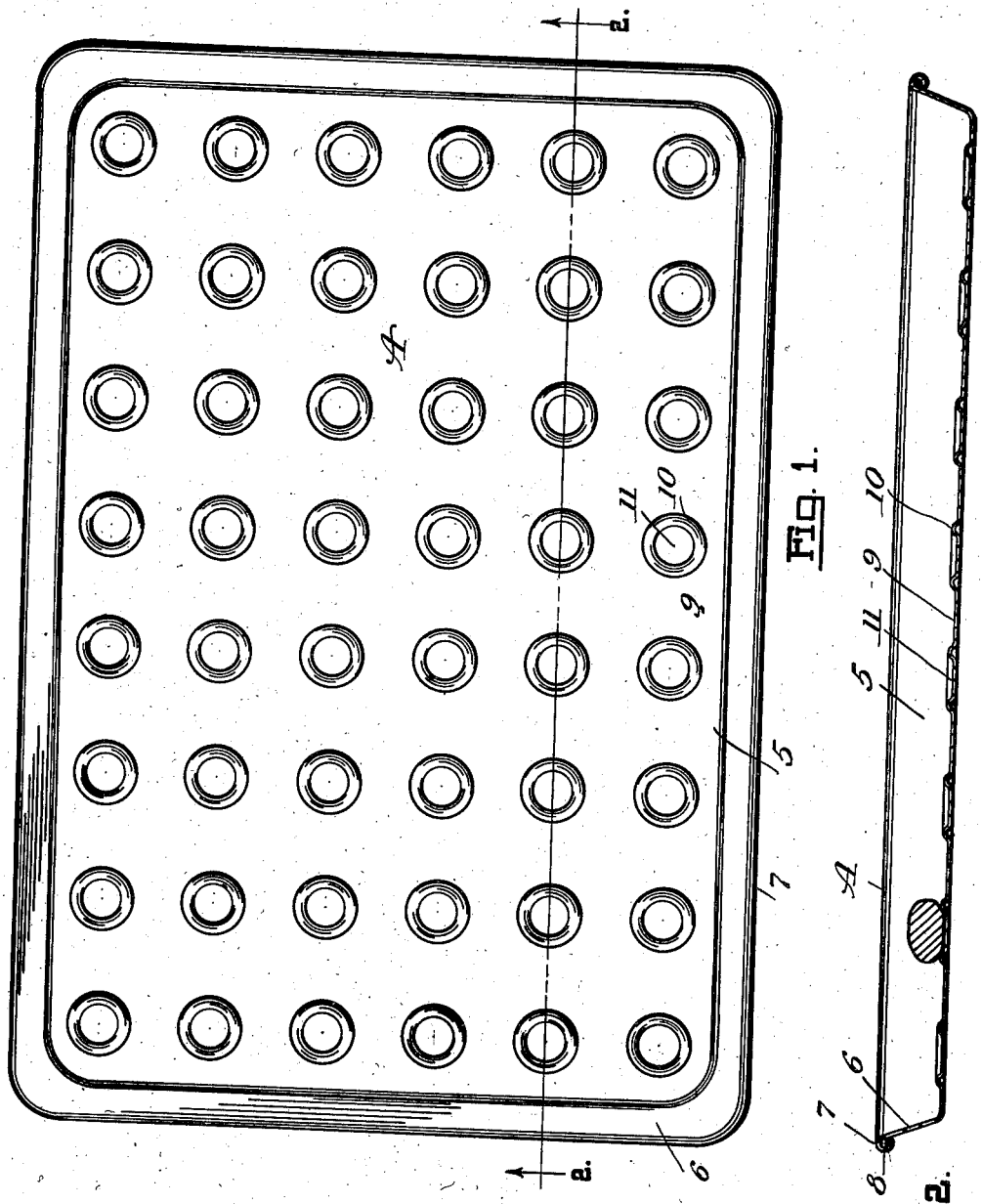
Edgar W. Ingram INVENTORS
Edward G. Billings
BY
ATTORNEY Patented Oct. 20, 1936

2,057,951

UNITED STATES PATENT OFFICE 2,057,951

BUN BAKING PAN

Edgar W. Ingram and Edward G. Billings, Columbus, Ohio, assignors to White Castle System, Inc., Columbus, Ohio, a corporation of Delaware Application November 16, 1935, Serial No. 50,202

1 Claim. (Cl. 53—6)

The invention relates to a baking pan and more especially to a bun locating baking pan.

The primary object of the invention is the provision of a pan of this character, wherein lumps of dough can be conveniently seated and accurately centered individually within a baking pan so that when the dough rises and is baked buns of uniform size and shape will be obtained, thereby avoiding irregularity in size and shape in the finished product.

Another object of the invention is the provision of a pan of this character, wherein the bottom thereof has formed therein a series of evenly spaced ring-like seats, these being adapted to hold balls or lumps of dough, so that the same can be baked with resultant uniform size and shape, the pan being of novel construction.

A further object of the invention is the provision of a pan of this character, which is extremely simple in construction, thoroughly reliable and efficient in its purpose, strong, durable, enabling the convenient baking of buns, and inexpensive to manufacture.

With these and other objects in view the invention consists in the features of construction, combination and arrangement of parts as will be hereinafter more fully described, illustrated in the accompanying drawing and pointed out in the claim hereunto appended.

In the accompanying drawing:

Figure 1 is a plan view of the pan constructed in accordance with the invention.

Figure 2 is a sectional view on the line 2—2 of Figure 1 looking in the direction of the arrows and showing a bun in place.

Similar reference characters indicate corresponding parts throughout the several views in the drawing.

Referring to the drawing in detail A designates generally a baking pan, preferably made from sheet metal and is in this instance of rectangular shape, although it may be made from any other material and of any required shape as may be demanded. The pan body 5 has a marginal upstanding rim 6 which is slightly outwardly flared and is formed with a curled free top edge 7 enclosing a strengthen wire 8, as usual.

Struck up from the bottom 9 of this pan A are longitudinally and transversely aligned spaced ring-like ridges 10 bounding flat centers 11, the ridges being of corresponding height with respect to each other and are arranged in parallel rows for locating and centering lumps or balls of dough 12, so that in the baking of the latter into buns the same will be of uniform size and shape.

The ridges are of rounded form at the uppermost raised faces thereof and the balls or lumps of dough 12 are held as shown in Figure 2 of the drawing.

What is claimed is:—

A pan of the kind described, comprising a body formed from sheet metal providing a flat bottom and an upstanding marginal rim, relatively small annular ribs struck upwardly from the flat bottom and distributed uniformly in spaced longitudinal and transverse rows throughout said bottom, the ribs being half-circular in cross-section and flat centers bordered by said annular ribs.

EDGAR W. INGRAM.
EDWARD G. BILLINGS.